(12) United States Patent
Kim et al.

(10) Patent No.: US 9,280,947 B2
(45) Date of Patent: Mar. 8, 2016

(54) DISPLAY DEVICE

(71) Applicant: Samsung Display Co., Ltd., Yongin (KR)

(72) Inventors: Duk-Sung Kim, Asan-si (KR); Dong-Gyu Shin, Asan-si (KR); Yeo Geon Yoon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 197 days.

(21) Appl. No.: 13/686,118

(22) Filed: Nov. 27, 2012

(65) Prior Publication Data
US 2014/0022148 A1    Jan. 23, 2014

(30) Foreign Application Priority Data

Jul. 19, 2012   (KR) .................. 10-2012-0078653

(51) Int. Cl.
*G09G 5/00*      (2006.01)
*G02F 1/1345*    (2006.01)
*G09G 3/20*      (2006.01)
*G02F 1/1362*    (2006.01)

(52) U.S. Cl.
CPC .............. *G09G 5/003* (2013.01); *G02F 1/1345* (2013.01); *G02F 1/136286* (2013.01); *G09G 3/2074* (2013.01); *G09G 3/2092* (2013.01); *G09G 2300/0404* (2013.01); *G09G 2300/0426* (2013.01)

(58) Field of Classification Search
CPC ... G09G 5/003; G09G 3/2092; G09G 3/2074; G02F 1/1345

USPC ................. 345/99, 87, 98, 139; 349/149, 152
See application file for complete search history.

(56) References Cited

U.S. PATENT DOCUMENTS

| | | | |
|---|---|---|---|
| 5,670,994 A | 9/1997 | Kawaguchi et al. | |
| 7,286,202 B2 | 10/2007 | Yamaguchi et al. | |
| 7,352,426 B2 | 4/2008 | Abe et al. | |
| 7,796,104 B2 * | 9/2010 | Kim | 345/87 |
| 8,031,318 B2 | 10/2011 | Aoki | |
| 2007/0097308 A1 * | 5/2007 | Liu et al. | 349/149 |
| 2007/0182909 A1 * | 8/2007 | Kim et al. | 349/149 |
| 2008/0203391 A1 * | 8/2008 | Kim et al. | 257/59 |
| 2010/0156769 A1 * | 6/2010 | Chang | 345/87 |

FOREIGN PATENT DOCUMENTS

| | | |
|---|---|---|
| JP | 09-311341 | 12/1997 |
| JP | 2001-166329 | 6/2001 |

(Continued)

*Primary Examiner* — Alexander Eisen
*Assistant Examiner* — Cory Almeida
(74) *Attorney, Agent, or Firm* — H.C. Park & Associates, PLC

(57) ABSTRACT

A display device includes a display panel and a data driver. The display panel includes at least one gate line, at least two data lines, a display area including a pixel connected to the at least one gate line and the at least two data lines, and a peripheral area outside the display area, the peripheral area including a pair of fan-out wiring structures. The data driver is configured to apply data voltage to the at least two data lines. Each of the pair of fan-out wiring structures includes a bent structure, the bent structure of one of the pair of fan-out wiring structures includes the same material as the at least one gate line, and the bent structure of the remaining one of the pair of fan-out wiring structures includes the same material as the at least two data lines.

16 Claims, 14 Drawing Sheets

(56) References Cited

FOREIGN PATENT DOCUMENTS

| | | |
|---|---|---|
| JP | 3276557 | 2/2002 |
| JP | 3508723 | 3/2004 |
| KR | 10-2006-0078675 | 7/2006 |
| KR | 10-2007-0027376 | 3/2007 |
| KR | 10-2007-0117268 | 12/2007 |
| KR | 10-0961268 | 5/2010 |
| KR | 10-2010-0121893 | 11/2010 |
| KR | 10-2011-0067227 | 6/2011 |
| KR | 10-2013-0101330 | 9/2013 |

* cited by examiner

DISPLAY DEVICE

CROSS-REFERENCE TO RELATED APPLICATION

This application claims priority from and the benefit of Korean Patent Application No. 10-2012-0078653, filed on Jul. 19, 2012, which is incorporated by reference for all purposes as if set forth herein.

BACKGROUND

1. Field

Exemplary embodiments of the present disclosure relate to display technology, and more particularly to display devices with reduced bezel and peripheral area sizes.

2. Discussion

Display devices utilize various underlying display technologies, such as, for example, one or more self-emissive or non-self-emissive display technologies, e.g., liquid crystal display (LCD) technology, organic light emitting display (OLED) technology, plasma display (PD) technology, electrophoretic display (EPD) technology, electrowetting display (EWD) technology, and/or the like. In this manner, display devices typically include a display panel and a driving unit configured to drive the display panel. The display panel is usually divided into a display area and a peripheral area that surrounds the display area. The driving unit and one or more other wires may be formed in the peripheral area.

As the design of display devices becomes more modern, these devices are becoming lighter, thinner, and less power hungry symbols of consumer desire. For instance, marketplace desires are driving the width of the bezel part of display devices towards the point of nonexistence. With the ever-shrinking dimensions of the bezel part becoming an iconography of display design has come the concomitant reduction in the width of the peripheral area surrounding the display area. Given, however, that the driving unit and various wires are typically housed in (or at least attached to) the peripheral area of conventional display devices, the dimensioning of the peripheral area is becoming more and more complex and serving to limit how thin manufacturers can make their display panels. This, however, is of little concern to the consumer who wants more sleek, feature-rich technological innovations.

Therefore, there is a need for an approach that provides reliable, cost effective techniques to reduce the size of display devices.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide a display device and display panel configured to enable more compact wiring in the peripheral area of the display panel, which further enables associated reductions in the sizing of the bezel part of the display device.

Additional aspects will be set forth in the detailed description which follows and, in part, will be apparent from the disclosure, or may be learned by practice of the invention.

According to exemplary embodiments, a display device includes: a display panel including: at least one gate line, at least two data lines, a display area including a pixel connected to the at least one gate line and the at least two data lines, and a peripheral area outside the display area, the peripheral area including a pair of fan-out wiring structures; and a data driver configured to apply data voltage to the at least two data lines, wherein each of the pair of fan-out wiring structures includes a bent structure, the bent structure of one of the pair of fan-out wiring structures includes the same material as the at least one gate line, and the bent structure of the remaining one of the pair of fan-out wiring structures includes the same material as the at least two data lines.

According to exemplary embodiments, a display panel includes: a substrate including: a display area associated with at least one subdivided pixel, and a non-display area; at least two pads disposed on the substrate and in the non-display area; a first signal transfer unit including a serpentine portion, the first signal transfer unit being disposed on the substrate, in the non-display area, and on a same layer as at least one of the at least two pads; a second signal transfer unit including a serpentine portion, the second signal transfer unit being disposed on the substrate, in the non-display area, and on a different layer than at least one of the at least two pads; and a connection unit, wherein the first signal transfer unit is directly connected between a first one of the at least two pads and a first transmission line connected to a first portion of the subdivided pixel, and wherein the connection unit is connected between a second one of the at least two pads and a second transmission line connected to a second portion of the subdivided pixel.

According to exemplary embodiments, at least some of the fan-out wirings may be configured in such a manner as to enable reductions in the length of the fan-out wirings, as well as enable reductions in fan-out area and, thereby, the sizing of the peripheral area and bezel part of corresponding display devices.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION

Figure 1:
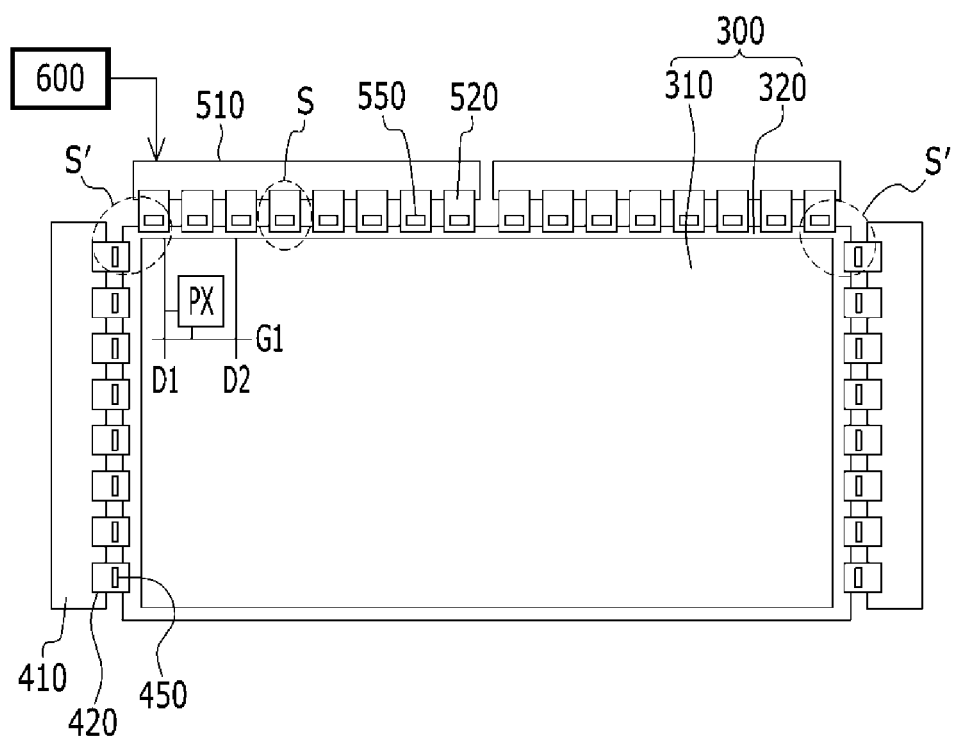
FIG. 1 is a block diagram of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers and/or regions may be exaggerated for clarity and descriptive purposes. Also, like reference numerals denote like elements.

When an element or layer is referred to as being "on," "connected to," or "coupled to" another element or layer, it may be directly on, directly connected to, or directly coupled to the other element or layer, or intervening elements or layers may be present. When, however, an element is referred to as being "directly on," "directly connected to," or "directly coupled to" another element or layer, there are no intervening elements or layers present. For the purposes of this disclosure, "at least one of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section that is discussed below may be termed a second element, component, region, layer, or section without departing from the teachings of the present invention.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
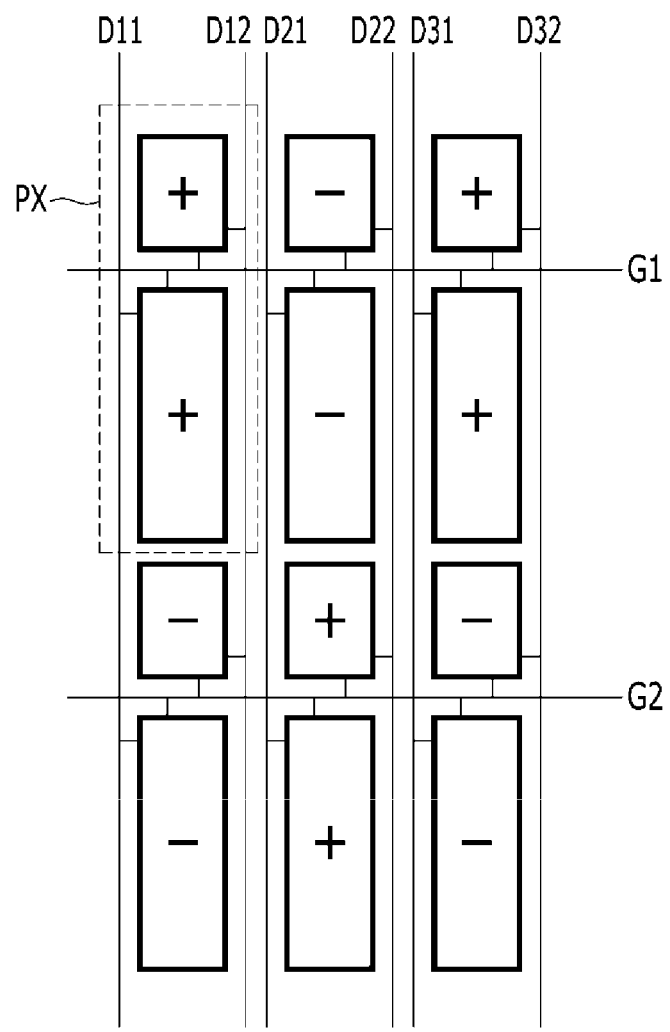
FIG. 2 is a schematic illustration of a pixel structure of the display device of FIG. 1, according to exemplary embodiments.

FIG. 1 is a block diagram of a display device, according to exemplary embodiments. FIG. 2 is a schematic illustration of a pixel structure of the display device of FIG. 1, according to exemplary embodiments.

As seen in FIGS. 1 and 2, the display device includes a display panel 300, a signal controller 600, a plurality of data drivers (e.g., data driver 550), and a plurality of gate drivers (e.g., gate driver 450). While specific reference will be made to this particular implementation, it is also contemplated that the display device may embody many forms and include multiple and/or alternative components or features. For example, it is contemplated that the components of the display device may be combined, located in separate structures, and/or separate locations.

Display panel 300 has a display area 310 including a plurality of pixels (e.g., pixel PX) and a peripheral area 320 surrounding the display area 310. The display panel 300 may implement any suitable display technology configured to present images. That is, the display panel 300 may implement one or more liquid crystal display (LCD) panels, organic light emitting display (OLED) panels, plasma display (PD) panels, electrophoretic display (EPD) panels, electrowetting display (EWD) panels, and/or the like. For descriptive purposes, exemplary embodiments will be described in association with an illustrative LCD panel among the aforementioned panels. An exemplary pixel PX will be described in more detail in association with FIG. 2.

Adverting to FIG. 2, individual pixels PX may be divided into one or more subpixels, such as divided into two subpixels, such that the one or more subpixels may be connected to corresponding gate lines (e.g., gate line G1), as well as connected to respective data lines (e.g., data lines D11 and D12). For descriptive purposes, exemplary embodiments are described in association with pixels PX including two subpixels. Although not illustrated in FIG. 2, each subpixel may be configured to include one or more thin film transistors and one or more pixel electrodes. Three terminals of the one thin film transistor are connected to the gate line, the data line, and the pixel electrode. To this end, the pixel electrode(s) may be patterned, such as, for example, according to one or more fine pattern configurations.

According to exemplary embodiments, the gate line G1 may be disposed on a substrate (e.g., substrate 110 of FIG. 4) associated with the display panel 300. An insulating layer (e.g., a gate insulating layer 140 of FIG. 4) may be disposed on the gate line G1, such that the data lines D11 and D12 may be disposed on the insulating layer. In various embodiments, a passivation layer (e.g., passivation layer 180 of FIG. 4) may be disposed on the data lines D11 and D12. It is contemplated, however, that the data lines D11 and D12 may be disposed above or below and, thereby, formed before or after the gate line G1 depending on design considerations or manufacturing preferences.

As depicted, two subpixels may be configured having different sizes, but it is contemplated that the subpixels may be configured similarly. Polarity of a data voltage is also illustrated in FIG. 2 via respective indications, i.e., "+" and "−." That is, data voltages having the same polarity may be applied to the two subpixels of individual pixels. It is contemplated, however, that the subpixels of an individual pixel may excited with similar or different data voltage polarities, e.g., all different, some different, etc.

According to exemplary embodiments, such as shown in FIG. 2, when a gate-on voltage is applied via a gate line (e.g., gate line G1), a pair of data voltages applied in a pair of data lines (e.g., data lines D11 and D12) may be applied to each subpixel.

In other exemplary embodiments, individual pixels may not be divided into subpixels, such that individual pixels may be connected to two gate lines and one data line or may be connected to one gate line and one data line.

Adverting back to FIG. 1, the data driver 550 may be configured to apply data voltage(s) to a plurality of data lines (e.g., data lines D1 and D2), and the gate driver 450 may be configured to sequentially apply the gate-on voltage to a plurality of gate lines, e.g., gate line G1.

According to exemplary embodiments, the data driver 550 and the gate driver 450 may be disposed on flexible printed circuits or printed circuit films (FPC) 520 and 420, which may be configured to respectively connect printed circuit boards (PCB) 510 and 410 and the display panel 300. That is, the data driver 550 may be formed on the data printed circuit film 520 that is configured to connect the data printed circuit board 510 and the display panel 300, whereas the gate driver 450 may be formed on the gate printed circuit film 420 that is configured to connect the gate printed circuit board 410 and the display panel 300. The printed circuit films 520 and 420 may be manufactured from any suitable flexible material so that the printed circuit boards (PCB) 510 and 410 may be bent and hidden behind the backside of the display panel 300.

As shown, the gate drivers 450, the gate printed circuit boards 410, and the gate printed circuit films 420 may be disposed on the left and right sides of the display panel 300, however, it is also contemplated that one or more of these components may be disposed on only one side of the display panel 300.

According to exemplary embodiments, at least one of the data driver 550 and the gate driver 450 may be formed together in the peripheral area 320 of the display panel 300, as well as formed in association with the forming of one or more pixels PX. It is noted, however, that forming the display panel 300 in such a manner may cause the width of the peripheral area 320 to be unnecessarily increased.

In exemplary embodiments, signals output from the data driver 550 and the gate driver 450 may be applied to one or more pad parts (e.g., pad parts P1 and P2 of FIG. 3) of the display panel 300 via one or more wirings disposed on the printed circuit films FPC 520 and 420. It is noted that pad parts P1 and P2 will be described in more detail in association with FIG. 3. To this end, the data driver 550 and the gate driver 450 may be controlled by one or more signal controllers, such as signal controller 600. As such, the signal controller 600 may be configured to control the data driver 550 and the gate driver 450 based on one or more image signals received from, for instance, an internal or external source, so as to enable an image(s) to be presented via the display panel 300.

According to exemplary embodiments, control signal(s) output from the signal controller 600 may be or otherwise include a data driver control signal and a gate driver control signal. As such, it is contemplated that the data driver control signal and the gate driver control signal may be included in separate or combined control signal(s). When combined, the data driver control signal and the gate driver control signal may be applied to the data printed circuit film 520 and, thereby, applied to the gate driver 450 via parts S and S' of the display panel 300, which may be connected to the data printed circuit film 520. It is noted, however, that such a configuration may cause a wiring associated with parts S and S' to be increased and, thereby, cause a size of the peripheral area 320 of the display panel 300 to be increased. As such, it is also contemplated that the gate driver control signal may be directly applied to the gate printed circuit board 410.

While the peripheral area 320 shown in FIG. 1 is shown having a very narrow configuration, it is noted that the peripheral area 320 may actually be much narrower when actually implemented. In other words, the relative sizing of and between the components depicted in association with FIG. 1 is misleading.

An exemplary structure of the peripheral area 320 will now be described in more detail in association with parts S and S', which may be disposed around one data driver 550.

Figure 3:
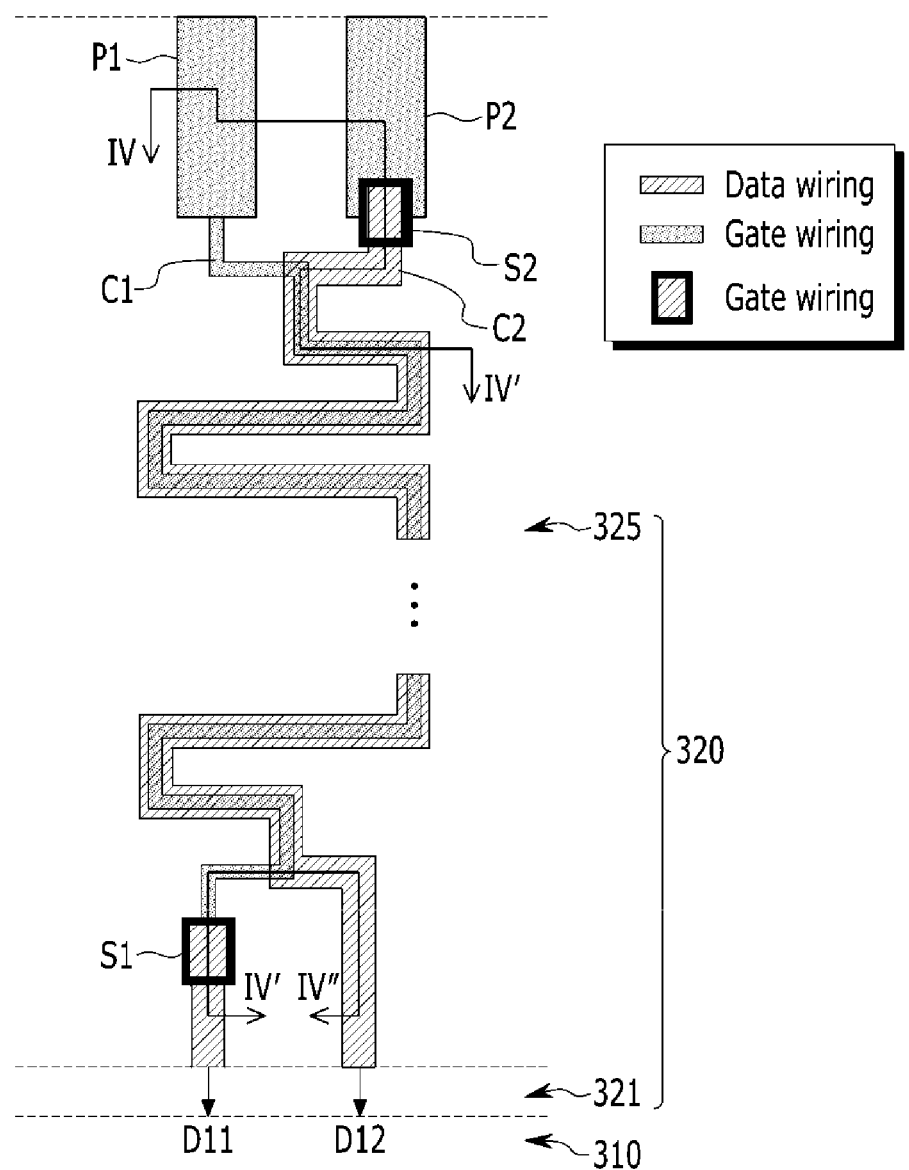
FIG. 3 is a schematic illustration of a pair of fan-out wirings of the display device of FIG. 1, according to exemplary embodiments.
Figure 4:
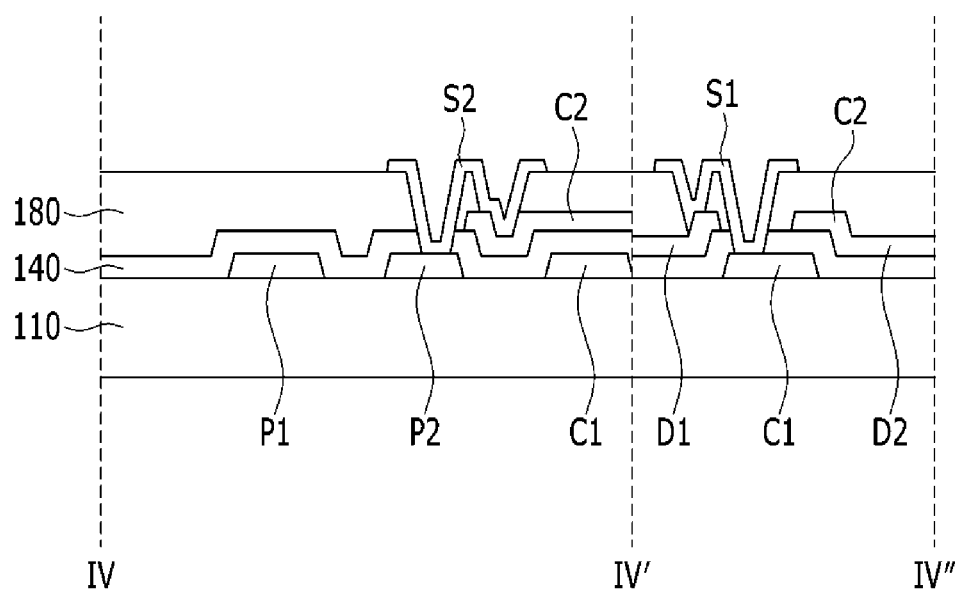
FIG. 4 is a cross-sectional view of the display device of FIG. 3 taken along sectional line IV-IV'-IV'', according to exemplary embodiments.

FIG. 3 is a schematic illustration of a pair of fan-out wirings of the display device of FIG. 1, according to exemplary embodiments. FIG. 4 is a cross-sectional view of the display device of FIG. 3 taken along sectional line IV-IV'-IV".

As shown in FIGS. 3 and 4, the peripheral area 320 may include a fan-out wiring area 325 and a static electricity prevention area 321. While specific reference will be made to this particular implementation, it is also contemplated that peripheral area 320 may embody many forms and include multiple and/or alternative components, features, and/or areas, as will become more apparent below. The static electricity prevention area 321 may be disposed closer to the display area 310 than the fan-out wiring area so that the fan-out wiring area 325 may be disposed adjacent to the data driver 550 and the data printed circuit film 520. In certain exemplary embodiments, a dummy pixel area (not shown) may be further included in the static electricity prevention area 321 and the display area 310.

The static electricity prevention area 321 may include various structures configured to prevent components of the display device (e.g., thin-film transistor components, etc.) from being damaged by, for example, static electricity built up and discharged in association with, for instance, pixels PX during the manufacture or use of the display device. According to exemplary embodiments, a plurality of thin film transistors or diodes may be formed in the static electricity prevention area 321, which may be configured to prevent the static electricity from building up and discharging in the display area 310.

The fan-out wiring area 325 may be disposed on (or otherwise extend into) at least a portion of the static electricity prevention area 321. To this end, fan-out wiring area may be configured to include the pads P1 and P2, signal transfer units C1 and C2, and a connection unit S1 and S2. As illustrated, the fan-out wiring area 325 is configured to apply a data voltage to two adjacent data lines (e.g., data lines D11 and D12). It is contemplated, however, that the fan-out wiring area 325 may be alternatively configured to enable the application of data and/or gate signals to corresponding components of the display device.

According to exemplary embodiments, a plurality of fan-out wiring structures (e.g., transmission lines, patterned components, etc.) may be disposed in the fan-out wiring area 325 of the peripheral area 320 of substrate 110. In this manner, individual fan-out wiring structures may include one or more corresponding pads P1 and P2 and signal transfer units C1 and C2. As depicted, the pads P1 and P2 are formed on the same layer as the gate line, and the transmission lines (or wiring) to which the fan-out wiring structures may be connected is formed on the same layer as the data line. In this manner, the transmission lines in the layer including the data line may be connected to the transmission lines in the layer including the gate line via at least one connection unit (e.g., connection unit S1 or S2). The connection unit S1 or S2 may be configured to connect a corresponding signal transfer unit (e.g., signal transfer unit C1 or C2) to the pad (e.g., pad P1 or P2) or the wiring disposed in a different layer than the associated signal transfer unit C1 or C2. As a result, the respective fan-out wiring structures may be considered as including the pads P1 and P2, the signal transfer units C1 and C2, and the connection units S1 and S2. It is contemplated, however, that the connection units S1 and S2 may be eliminated.

The fan-out wiring structure connected to the data line D11 will be now described in more detail. For ease of description, this fan-out wiring structure may also be referred to, herein, as the fan-out wiring for data line D11.

With continued reference to FIGS. 3 and 4, the fan-out wiring for data line D11 includes the pad P1 and the signal transfer unit C1, which are disposed on the same layer as the gate line, e.g., gate line G1, as well as includes the connection unit S1. In this manner, the fan-out wiring for data line D11 may be connected to the transmission lines of the data line layer disposed on a "last end" layer disposed on (e.g., above) the layer including the gate line. As previously mentioned, however, the gate lines and data lines may be formed in different layers (e.g., the gate lines may be disposed in association with a layer disposed on a layer including the data lines) and, therefore, the disposition of the various components of the fan-out wiring for data line D11 may be correspondingly configured.

The signal transfer unit C1 may be configured according to a zigzag structure (or pattern) bent in a shape of a squared-off numeral two, e.g., "ㄹ," such as bent in a serpentine fashion. It is contemplated, however, that the signal transfer unit C1 may be bent in other configurations that are configured to facilitate the reduction in the width of the peripheral area 320, as well as to achieve one or more of the other features or functions described herein. In exemplary embodiments, signal transfer unit C1 is also configured to adjust the resistive characteristics of the fan-out wiring for data line D11. That is, since a control signal may be applied to the fan-out wiring for data line D11 and since the fan-out wiring for data line D11 includes structure in which the signal transfer unit C1 spreads in a radial form, the lengths of the respective fan-out wiring structures may be different. The differences in lengths and potential inconsistences within the materials utilized to form the fan-out wiring structures may cause the resistive characteristics of these structures to be different, which may affect the signal delay characteristics associated with respective fan-out wiring structures. Accordingly, the resistive characteristics of individual fan-out wiring structures may be respectively normalized (e.g., individually adjusted) by arranging and sizing the bending configuration of the signal transfer units (e.g., signal transfer units C1 and C2) and/or by adjusting an overall length of the fan-out wiring structure associated with, for instance, a "shortest" overall length.

According to exemplary embodiments, the connection unit S1 may be manufactured from the same material as a corresponding pixel electrode to which the connection unit S1 is connected. It is noted that the pixel electrode may be disposed on the passivation layer 180, which may be disposed on the gate insulating layer 140 that may be configured to cover at least a portion of pad parts P1 and P2 and at least a portion of connection units C1 and C2.

The fan-out wiring structure connected to the data line D12 will now be described in more detail. For ease of description, this fan-out wiring structure may also be referred to, herein, as the fan-out wiring for data line D12.

As seen in FIGS. 3 and 4, the fan-out wiring for data line D12 includes the pad P2 disposed on the same layer as the gate line, e.g., gate line G1, as well as includes the signal transfer unit C2 disposed on the same layer as the data line, e.g., data line D12. In this manner, the connection unit S2 may be disposed and, thereby, configured to connect the pad P2 and the signal transfer unit C2. As seen in the depicted exemplary embodiment, since the signal transfer unit C2 may be disposed on the same layer as the wiring in the data line layer disposed on the "last end" layer, the signal transfer unit C2 may be directly connected to the data line without a separate connection unit; however, it is contemplated that a connection unit may be utilized. As previously mentioned, however, the gate lines and data lines may be formed in different layers (e.g., the gate lines may be disposed in association with a layer disposed on a layer including the data lines) and, therefore, the disposition of the various components of the fan-out wiring for data line D12 may be correspondingly configured.

The signal transfer unit C2 may be configured according to a zigzag structure (or pattern) bent in a shape of a squared-off numeral two, e.g., "ㄹ." Again, it is also contemplated that the signal transfer unit C2 may be bent in other configurations that are configured to facilitate the reduction in the width of the peripheral area 320, as well as to achieve one or more of the other features or functions described herein. In this manner, at least a corresponding portion of each of the bent structure of the signal transfer unit C2 and the bent structure of the signal transfer unit C1 may be configured to overlap one another.

As previously mentioned, each of the respective fan-out wiring structures may be configured to have a normalized resistive characteristic, such that the fan-out wiring for the data line D11 and the fan-out wiring for the data line D12 may be configured with the same overall resistive properties, which may enable better signal transmission characteristics.

As previously mentioned, the gate lines and the data lines may be formed of the same material, but may be configured, according to exemplary embodiments, with different thicknesses. Even still, the gate lines and the data lines may be configured with different widths so that the corresponding resistive characteristics of the gate lines and the data lines may be normalized or, in other words, configured with a same overall resistive property. As seen in FIG. 3, the width of the signal transfer unit C1 is different from the width of the signal transfer unit C2. This, however, may simply be the result of the difficulty in illustrating the overlap between the signal transfer unit C1 and the signal transfer unit C2 when the component widths are the same. That is, when the gate lines and the data lines are manufactured from the same material and the thicknesses of the gate lines and the data lines are the same, the signal transfer unit C1 and the signal transfer unit C2 may be configured with the same width, so as to make the resistive characteristics of these components the same. As such, the respective dimensioning between the various components illustrated in the figures should not be considered indicative of all exemplary embodiments or even the exemplary embodiments described herein.

In exemplary embodiments, the gate lines and the data lines may be manufactured from different materials. As such, even if the gate lines and the data lines are configured in this manner, the respective thicknesses, line widths, and/or lengths of the signal transfer unit C1 and the signal transfer unit C2 may be configured (or otherwise adjusted) to enable the gate lines and the data lines to have the same overall resistive characteristics. In this manner, it is noted that a connection unit manufactured from the same material as the pixel electrode may be additionally included to enable the overall resistive characteristics to remain normalized.

In some instances, the pair of fan-out wiring structures illustrated in FIGS. 3 and 4 may include a relatively "long" overlapping section, such that a capacitance may be generated between, for instance, signal transfer unit C1 and signal transfer unit C2. As such, this relatively "long" overlapping section may cause corresponding signal interference characteristics between these components. To overcome or at least reduce any potential for signal interference issues resulting from the aforementioned "long" overlapping section, the fan-out wiring structure may be connected to a pair of data lines D11 and D12, which are correspondingly connected to a same pixel, e.g., pixel PX of FIG. 2, the effect of which is described in more detail below.

The application of data voltage to a pair of data lines (e.g., data lines D11 and D12) will now be described in more detail.

Figure 5:
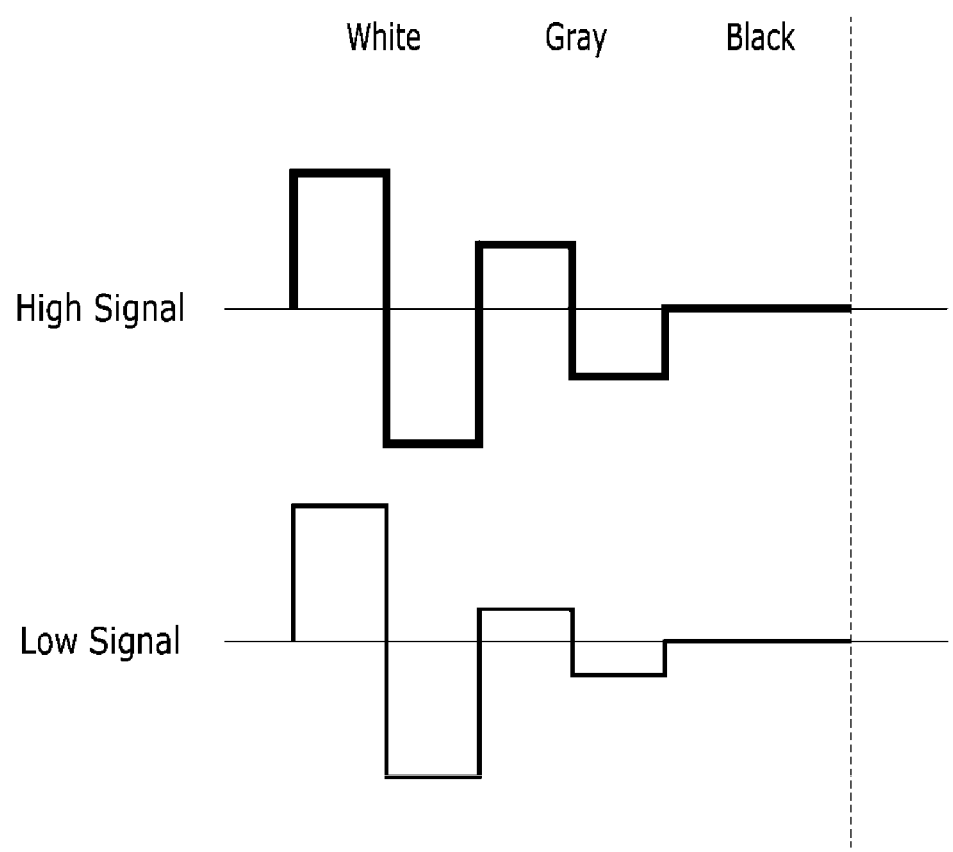
FIGS. 5 and 6 demonstrate the application of data voltage in a display device, according to exemplary embodiments.
Figure 6:
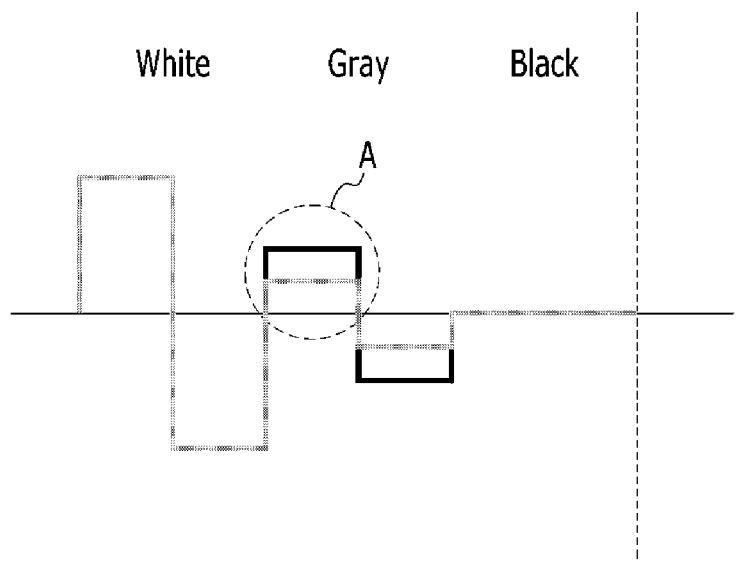

FIGS. 5 and 6 demonstrate the application of data voltage in a display device, according to exemplary embodiments.

As seen in FIG. 5, a high signal, which may represent a data voltage, may be applied to a "high" subpixel (e.g., the smaller of the two subpixels enclosed by the dashed box and, thereby, disposed in an upper side among the subpixels of FIG. 2 embodying pixel PX), and a low signal, which may represent a data voltage, may be applied to a "low" subpixel (e.g., the larger subpixel of the two subpixels enclosed by the dashed box and, thereby, disposed in a lower side among the subpixels of FIG. 2 embodying pixel PX). In this manner, it is to be understood that FIG. 5 separately illustrates the data voltages applied to the above-noted subpixels, whereas FIG. 6 illustrates the data voltages applied to the above-noted subpixels as a single graph to facilitate visual comparison of the respective voltages.

Adverting to FIG. 6, the high signal and the low signal may be characterized with the same voltage amplitude in association with a white voltage (e.g., a maximum voltage to be applied) and a black voltage (e.g., a minimum voltage to be applied). That is, when pixel PX is excited via corresponding data lines (e.g., data lines D11 and D12) to display a white or black presentation, the respective voltages applied to the two corresponding subpixels may have the same amplitude (or size) and the same polarity. As such, even if the two signal transfer units C1 and C2 overlap in the fan-out wiring structure, the mutual interference due to a magnitude difference in the respective voltages will not result.

When, however, the pixel is excited to present an intermediate tone (e.g., gray) presentation, a difference between the data voltage magnitudes applied to the pair of data lines may be generated. Since, however, the difference between these data voltages is relatively small, any resultant mutual interference will not be large enough to create a significant amount of signal interference. That is, when a pair of fan-out wiring structures overlap each other as illustrated in FIG. 3 and are connected to adjacent pixels (or the subpixels of different pixels), and when the two pixels are to present different grayscale tones, then a difference between the two data voltages may be large. As such, the difference between the two data voltages may further increase when the polarity is inverted with respect to the different pixels. Accordingly, the resultant signal interference may be avoided by configuring the pair of fan-out wiring structures to connect to different subpixels of a same pixel and, thereby, driving them in association with the data voltage signals of FIGS. 5 and 6. Exemplary embodiments, however, may even be utilized if the aforementioned voltage difference occurs. Namely, display quality may also be improved by manufacturing the gate insulating layer 140 from (or including) a low-k material. To this end, it is noted that the gate insulating layer 140 is disposed between the two wirings (i.e., the gate line and the data line). Another way to improve display quality is to increase a thickness of the gate insulating layer 140. In either instance, a capacitance generated due to the overlap of the wirings can be minimized. Furthermore, application timing of the data voltages applied to the pair of fan-out wiring structures overlapping each other may be configured so that the transmission of the data voltages do not overlap each other to produce large data voltage differences. For instance, the time of the application of the data voltages may be divided in half, so that the data voltages are alternately applied to the pair of overlapping fan-out wiring structures. Such a timing sequence can prevent the two data voltages from interfering with one another.

Figure 11:
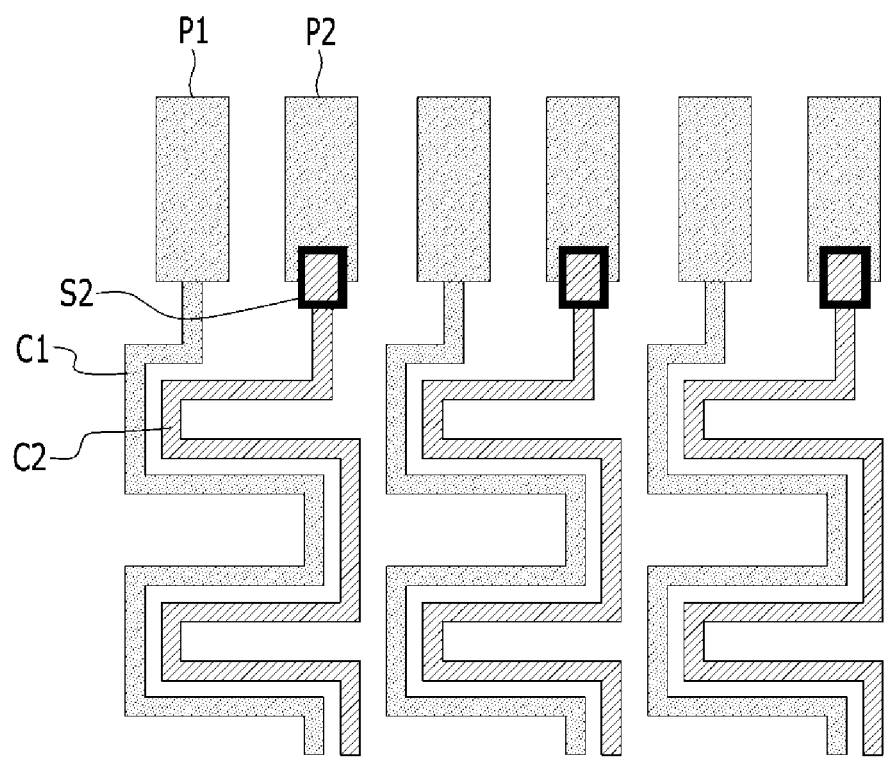
Figure 12:
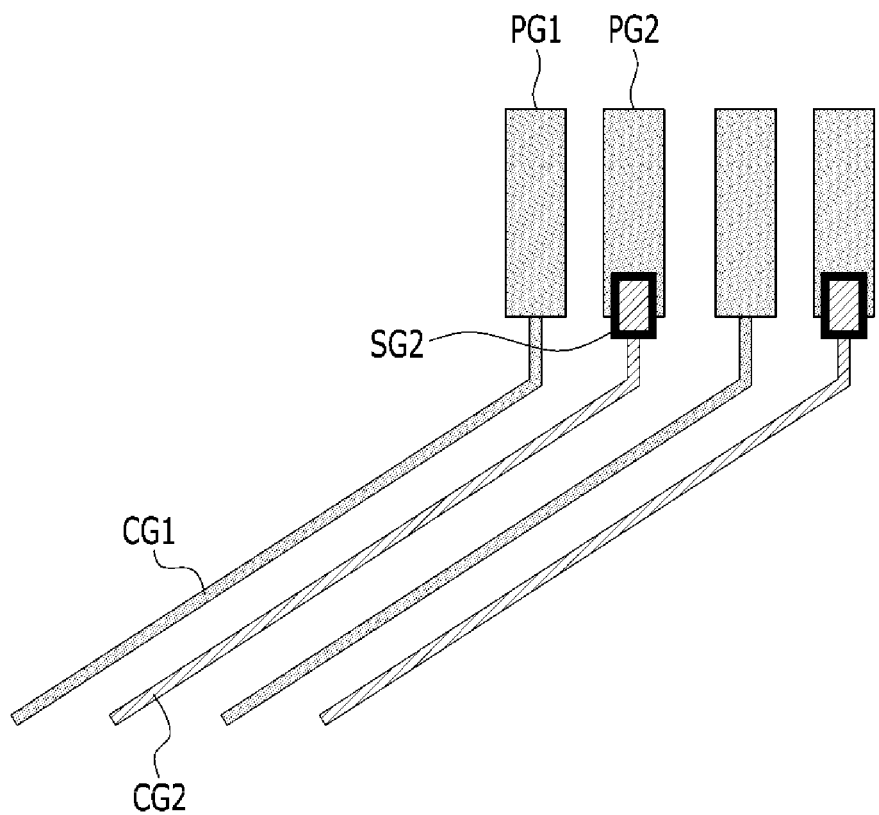
Figure 13:
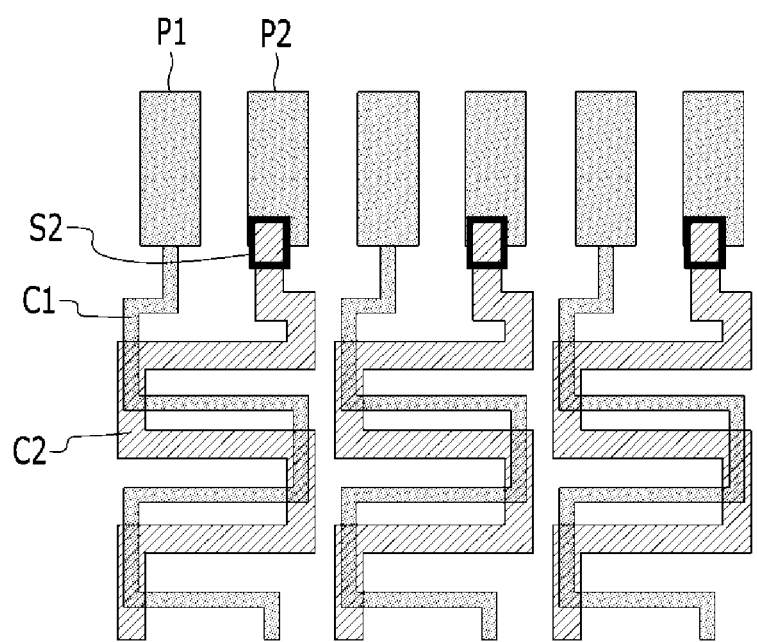
Figure 14:
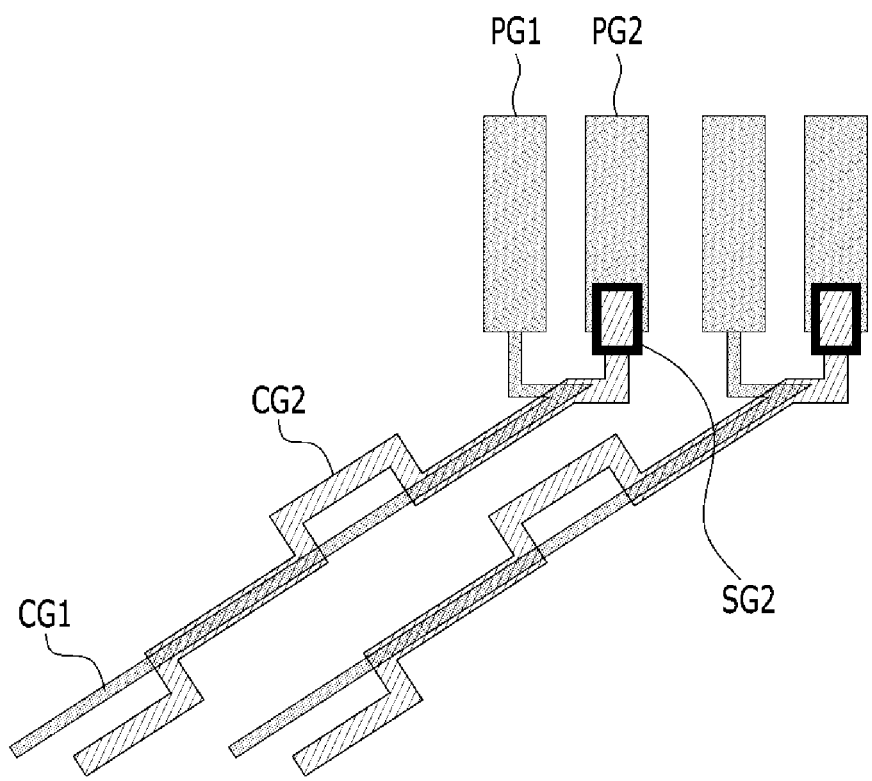

According to exemplary embodiments, the pair of fan-out wiring structures may also be configured so that they do not overlap one another (such as depicted in FIGS. 11 and 12) or may be configured to partially overlap (such as depicted in FIGS. 13 and 14), which may also serve to reduce the potential for signal interference. These configurations will be described in more detail in association with FIGS. 11-14.

In exemplary embodiments, the fan-out wiring structures may also be configured to slantedly extend in the fan-out wiring area 325 with respect to an outer line of the display area 310. This will be described in more detail in association with FIG. 7.

Figure 7:
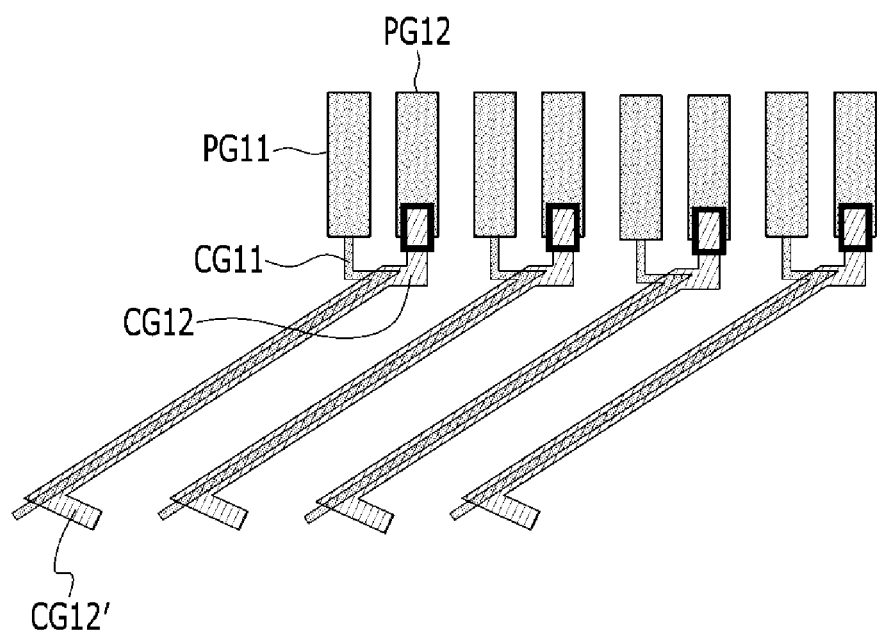
FIG. 7 is a schematic illustration of a fan-out wiring structure, according to exemplary embodiments.

FIG. 7 is a schematic illustration of a fan-out wiring structure, according to exemplary embodiments.

As shown, each of the fan-out wiring structures include corresponding pads PG11 and PG12, which are directly or indirectly connected to respective signal transfer units CG11 and CG12. Pads PG11 and PG12 may be disposed on the same layer as that of the gate line, and the wiring (or transmission line) to which the fan-out wiring structures are to be connected is disposed on the same layer as the data line. In this manner, the wiring in the layer of the data line and the wiring in the layer of the gate line are connected to pads PG11 and PG12 via a connection unit. That is, pad PG11 is directly connected to the wiring disposed on the layer including the gate line via a connection unit (not shown) and pad PG12 is connected to the wiring disposed on the layer including the data line via a connection unit, which is illustrated as a bolded rectangular square between pad PG12 and signal connection unit CG12. Further, the fan-out wiring structures overlap in the diagonal direction to which they extend, such that the fan-out wiring structures may be bent and separated from one another in a last end layer. As such, at least one of the pair of fan-out wiring structures includes a bent portion CG12' that is bent in at least one direction different than the diagonal direction to which the fan-out wiring structures generally extend. Bent portion CG12' is described in more detail below. In this manner, an overall fan-out wiring structure may include the pads PG11 and PG12, the signal transfer units CG11, CG12, and CG12', and the connection unit. Again, while specific reference will be made to this particular implementation, it is also contemplated that an overall fan-out wiring structure may embody many forms and include multiple and/or alternative components or features.

As previously mentioned, the fan-out wiring structure includes the pad PG11 disposed on the same layer as the gate line and the signal transfer unit CG11 is disposed on the same layer as the gate line, and includes a connection unit (not shown) configured to connect the wiring to the wiring in the data line layer disposed in the "last-end" layer. Accordingly, it is noted that the signal transfer unit CG11 may not have a zigzag bent structure, as opposed to the zigzag bent structure illustrated in association with FIG. 3. The zigzag bent structure may not be utilized because the fan-out wiring may include a sufficiently large resistive characteristic due to its extension in the diagonal direction.

As also previously mentioned, the fan-out wiring structure further includes the pad PG12 disposed on the same layer as the gate line and the signal transfer unit CG12 disposed on the same layer as the data line. In this manner, the connection unit may be disposed and, thereby, configured to connect the pad PG12 and the signal transfer unit CG12, which are disposed in different layers. The signal transfer unit CG12 is disposed on the same layer as that of the wiring of the data line disposed in the last end layer, such that the data line may be directly connected with the signal transfer unit CG12 without a separate connection unit. As shown, however, signal transfer unit CG12 includes the bent portion CG12' that is configured to facilitate connection with the corresponding data line. Accordingly, it is noted that the signal transfer unit CG12 overlaps the signal transfer unit CG11 along most of the respective portions of these components extending in the diagonal direction.

According to exemplary embodiments, each of the fan-out wiring structures may be configured to exhibit the same normalized resistive characteristics. Such a configured enables the fan-out wiring for the data line D11 and the fan-out wiring for the data line D12 to also exhibit the same resistive characteristics. It is also noted that the fan-out wiring structure illustrated in connection with FIG. 3 and the fan-out wiring structure depicted in FIG. 7 may be implemented together and, thereby, configured to apply the output of data driver 550 to the plurality of data lines of the display apparatus. This combinatory configuration is described in more detail in association with FIG. 8.

Figure 8:
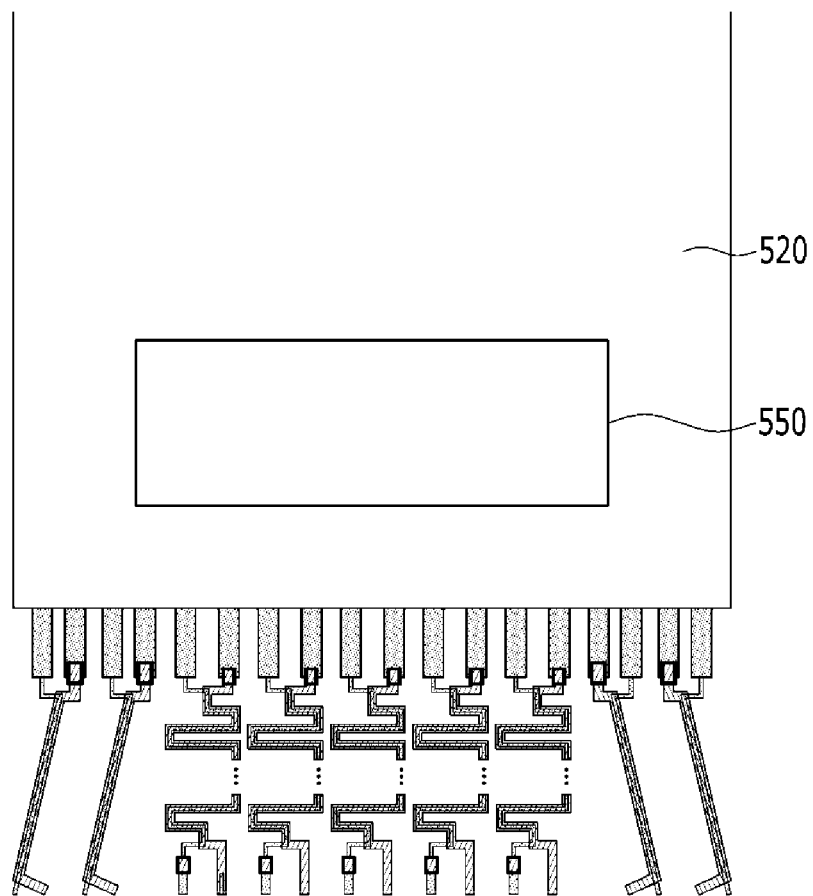
FIG. 8 is a schematic illustration of a fan-out wiring structure of a fan-out area including the fan-out wirings of FIGS. 3 and 7, according to exemplary embodiments.

FIG. 8 is a schematic illustration of a fan-out wiring structure of a fan-out area including the fan-out wirings of FIGS. 3 and 7, according to exemplary embodiments.

As shown, a plurality of data voltages output from data driver 550 may be applied to the pads of the respective fan-out wiring structures via wirings (not shown) disposed as part of the data printed circuit film 520. In this manner, the fan-out wiring structures are configured to apply the data voltages to the corresponding data lines of the display area 310.

As illustrated in association with both FIGS. 1 and 8, the fan-out wiring structures extend while spreading in a radial form to traverse the respective areas between the printed circuit film 520 and display panel 300. According to exemplary embodiments, the fan-out wiring structures described in association with FIG. 3 may be disposed in a center region of the printed circuit film 520, whereas the fan-out wiring structures described in association with FIG. 7 may be disposed in one or more outer regions, such as respective outer regions disposed at either side of the aforementioned center region. To this end, it is noted that each of the fan-out wiring structures (whether described in association with FIG. 3 or FIG. 7) may be configured to exhibit the same overall resistive characteristic. In other words, the various fan-out wiring structures may be configured to reduce (if not eliminate) disparate transmission delays between the various fan-out wiring structures.

According to exemplary embodiments, the respective pairs of fan-out wiring structures extend and overlap, such that the left and right spaces in which the fan-out wiring structures are extended in zigzag patterns in the peripheral area 320 increases by, for instance, two times. As such, the zigzag pattern may be shortened and, thereby, enable the width of the peripheral area 320 to be decreased.

To this end, the fan-out wiring structures disposed in the outer region(s) of the printed circuit film 520 may be extended in a diagonal direction, which was described in association with FIG. 7. It is noted that the fan-out wiring structures disposed in association in a first outer region may be extended in a first diagonal direction, whereas the fan-out wiring structures disposed in association with a second outer region may be extended in a second diagonal direction, different than the first diagonal direction.

As previously mentioned, the fan-out wiring structures may be additionally and/or alternatively configured, such as, in accordance with, one or more of the exemplary embodiments that will be described in more detail in association with FIGS. 9-14. To this end, it is noted that respective pairs of the aforementioned fan-out wiring structures of FIGS. 9-14 may be combine in a manner similar to those described in association with FIG. 8. For example, the fan-out wiring structures of FIGS. 9 and 10 may be combined, the fan-out wiring structures of FIGS. 11 and 12 may be combined, and the fan-out wiring structures of FIGS. 13 and 14 may be combined. It is also contemplated that various other combinations of the fan-out wiring structures described in connection with FIGS. 3, 7, and 9-14 may be utilized. To this end, it is noted that the exemplary fan-out structures depicted in FIGS. 3, 7, and 9-14 are by no mean exhaustive and, as such, other structures configured to achieve like goals are certainly contemplated and may be utilized.

FIGS. 9-14 are schematic illustrations of various fan-out wiring structures, according to exemplary embodiments.

Figure 9:
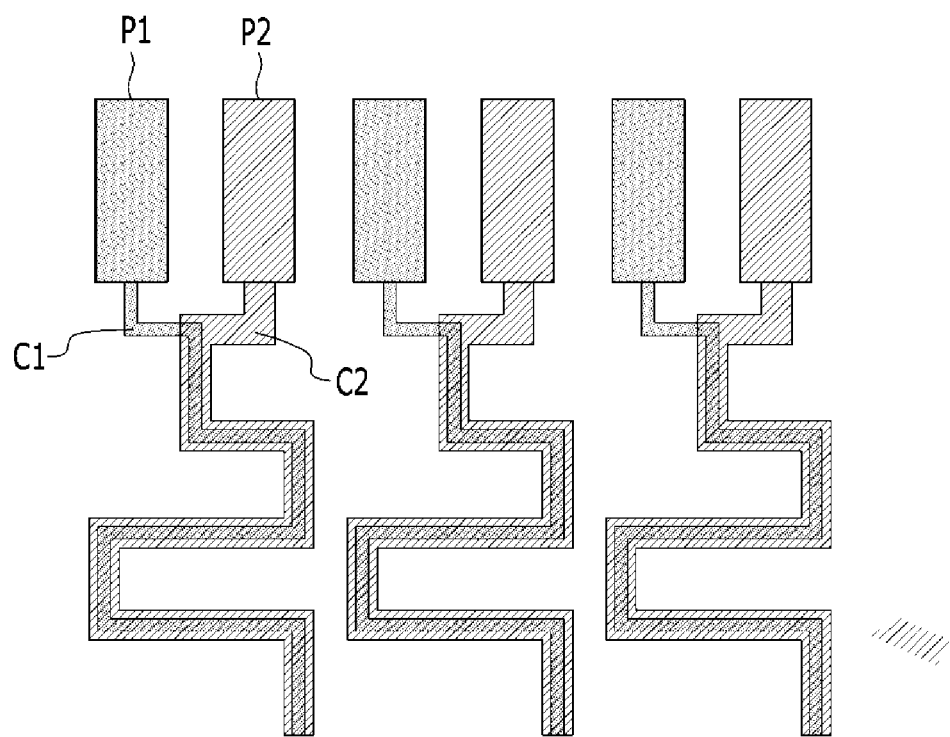
FIGS. 9-14 are schematic illustrations of various fan-out wiring structures, according to exemplary embodiments.
Figure 10:
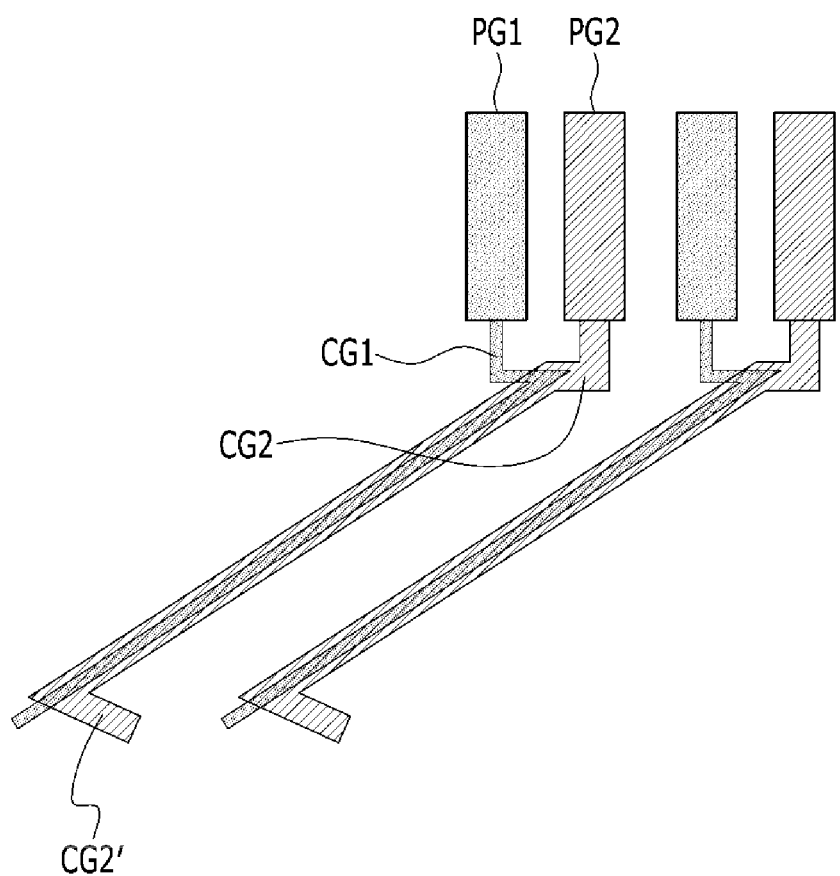

As previously noted, the fan-out wiring structures depicted in connection with FIGS. 9 and 10 may be incorporated as part of a display device similarly to the fan-out wiring structures described in association with FIGS. 3, 7, and 8. The fan-out wiring structures of FIGS. 9 and 10, however, include respective pads of a pair of fan-out wiring structures being disposed in different layers. In this manner, the configuration shown in FIG. 9 may be similar to that described in connection with FIG. 3, however, is different in that the pad P2 may be disposed in the same layer as the data line, whereas pad P1 may be disposed in the same layer as the gate line. Of course, the alternative may also be utilized, i.e., pad P1 may be disposed in the same layer as the data line and pad P2 may be disposed in the same layer as the gate line.

According to exemplary embodiments, the fan-out wiring structure associated with pad P1 may, thereby, include the pad P1 disposed on the same layer as the gate line, which also includes the disposition of the signal transfer unit C1. In this manner, a connection unit (not shown) may be disposed and, thereby, configured to connect the wiring in the layer associated with the data line, which may be disposed on a "last-end" layer. As such, the signal transfer unit C1 may exhibit a zigzag structure bent in the shape of a squared-off numeral two, e.g., "ㄹ." As also previously described, the patterned configuration may be configured to normalize the resistivity characteristics of the respective fan-out wiring structures. Further, it is noted that the connection unit may be manufactured from (or include) the same material as a pixel electrode, and the pixel electrode may be disposed on the passivation layer 180, as shown in FIG. 4.

The fan-out wiring structure associated with the pad P2 may, thereby, include the pad P2 disposed on the same layer as the data line, which also includes the disposition of the signal transfer unit C2. In this manner, the pad P2 and the signal transfer unit C2 may be directly connected without a separate connection unit; however, it is contemplated that that a connection unit may be utilized. Further, the signal transfer unit C2 may be disposed on the same layer as the wiring associated with the data line disposed in the "last-end" layer and, as such, the signal transfer unit C2 may be directly connected with the data line without a separate connection unit. It is contemplated, however, that connection units may be utilized. To this end, the signal transfer unit C2 may exhibit a zigzag structure bent in the shape of a squared-off numeral two, e.g., "ㄹ," such that the signal transfer unit C2 may overlap at least a portion of the signal transfer unit C1. In exemplary embodiments, signal transfer unit C2 may overlap a significant portion of signal transfer unit C1 in the fan-out wiring area 325 and/or the peripheral area 320.

Adverting to FIG. 10, it is noted that the depicted fan-out wiring structure may be similarly configured as the fan-out wiring structure of FIG. 7, but may be different in that the pad PG2 may be disposed in the same layer as the data line, whereas the pad PG1 may be disposed in the same layer as the gate line.

According to exemplary embodiments, the fan-out wiring structure associated with pad PG1 may, thereby, include the pad PG1 disposed on the same layer as the gate line, as well as include the signal transfer unit CG1 disposed on the same layer as the gate line. To this end, the fan-out wiring structure associated with pad PG1 may further include a connection unit (not shown) that is configured to connect the pad PG1 to the wiring in the layer associated with the data line, which may be disposed on the last-end layer. The connection unit may be disposed on the same layer as the pixel electrode.

As seen in FIG. 10, the signal transfer unit CG1 may not have a zigzag bent structure as the signal transfer unit C1 illustrated in FIG. 9. Namely, because the fan-out wiring structure associated with signal transfer unit CG1 may exhibit a sufficiently large resistivity characteristic due to its extension in the diagonal direction, patterning signal transfer unit CG1 in a zigzag shape may not be necessary. It is contemplated, however, that the fan-out wiring structure associated with signal transfer unit CG1 may be patterned according to a zigzag bent structure, as well as configured to extend in a diagonal direction.

According to exemplary embodiments, the fan-out wiring structure associated with pad PG2 may, thereby, include the pad PG2 disposed on the same layer as the data line, as well as include the signal transfer unit CG2 disposed on the same layer as the data line. In this manner, the pad PG2 and the signal transfer unit CG2 may be directly connected without a separate connection unit; however, it is contemplated that a connection unit may be utilized. To this end, the signal transfer unit CG2 may be disposed on the same layer as the wiring associated with the data line disposed on the "last-end" layer. As such, the pad PG2 may be directly connected with the signal transfer unit CG2 without a separate connection unit. In exemplary embodiments, the signal transfer unit CG2 may include the bent portion CG2' configured to enable the connection with the wiring associated with the data line. It is noted that the signal transfer unit CG2 may be configured to overlap at least a portion of the signal transfer unit CG1. For instance, signal transfer unit CG2 may be configured to overlap a significant portion of signal transfer unit CG1 in the fan-out wiring area 325 and/or the peripheral area 320. To this end, the fan-out wiring structure associated with signal transfer unit CG2 may include portion CG2' and, thereby, not utilize a separate connection unit. It is contemplated; however, that a connection unit may be utilized.

According to exemplary embodiments, the signal transfer units of the respective pairs of the fan-out wiring structures may be configured so that they do not overlap one another. Such a configuration is described in more detail in association with FIGS. 11 and 12.

It is generally noted that the configuration of the fan-out wiring structure of FIG. 11 may similar to the fan-out wiring structure of FIGS. 3 and 9, but may be different in that the correspondingly paired signal transfer units are configured to not overlap one another. To this end, it is noted that even though the signal transfer units do not overlap one another, the pair of adjacent fan-out wiring structures may be formed in different layers, which may serve to reduce an interval between the respective fan-out wiring structures. In this manner, a width of the peripheral area 320 may also be decreased.

As seen in FIG. 11, the fan-out wiring structure associated with pad P1 may, thereby, include the pad P1 disposed on the same layer as the gate line, as well as include the signal transfer unit C1 disposed on the same layer as the gate line. To this end, the fan-out wiring structure associated with pad P1 may further include a connection unit (not shown) disposed and, thereby, configured to connect the wiring in the layer associated with the data line, which may be disposed on a "last-end" layer. As such, the signal transfer unit C1 may exhibit a zigzag structure bent in a shape of a squared-off numeral two, e.g., "ㄹ." As previously mentioned, the patterned configuration may be configured to normalize the resistivity characteristics of the fan-out wiring structures. Further, it is noted that the connection unit may be manufactured from (or include) the same material as a pixel electrode, and the pixel electrode may be disposed on the passivation layer 180, as shown in FIG. 4.

The fan-out wiring structure associated with the pad P2 may, thereby, include the pad P2 disposed on the same layer as the gate line, as well as include the signal transfer unit C2 disposed on the same layer as the data line. In this manner, the pad P2 and the signal transfer unit C2 may be directly connected by a connection unit S2. Further, the signal transfer unit C2 may be formed on the same layer as the wiring of the data line, which may be disposed on the "last-end" layer. As such, the signal transfer unit C2 may be directly connected with the data line without a separate connection unit; however, it is contemplated that a connection unit may be utilized. In exemplary embodiments, the signal transfer unit C2 may exhibit a zigzag structure bent in a shape of a squared-off numeral two, e.g., "ㄹ." To this end, the signal transfer unit C2 may be spaced apart from the signal transfer unit C1 by a predetermined distance, such that the signal transfer unit C2 does not overlap the signal transfer unit C1.

Adverting to FIG. 12, it is noted that the illustrated fan-out wiring structure may be similar to the fan-out wiring structure of FIGS. 7 and 10, but may be different in that the signal transfer units C1 and C2 may be configured so that they do not overlap one another. Further, the fan-out wiring structure associated with pad PG2 may be configured without a corresponding bent portion, such as bent portion CG2'.

According to exemplary embodiments, the fan-out wiring structure associated with pad PG1 may, thereby, include the pad PG1 disposed on the same layer as the gate line, as well as include the signal transfer unit CG1 disposed on the same layer as the gate line. To this end, the fan-out wiring structure associated with pad PG1 may further include a connection unit (not shown) that is configured to connect to the wiring in the layer associated with the data line, which may be disposed on a "last-end" layer. The connection unit may be disposed on the same layer as the pixel electrode.

As seen in FIG. 12, the signal transfer unit CG1 may not exhibit a zigzag bent structure as the signal transfer unit C1 illustrated in FIG. 11. Namely, because the fan-out wiring structure associated with signal transfer unit CG1 may exhibit a sufficiently large resistivity characteristic due to its extension in a diagonal direction, patterning signal transfer unit CG1 in a zigzag shape may not be necessary. It is contemplated, however, that the fan-out wiring structure associated with signal transfer unit CG1 may be patterned according to a zigzag bent structure, as well as configured to extend in a diagonal direction.

According to exemplary embodiments, the fan-out wiring structure associated with pad PG2 may, thereby, include the pad PG2 disposed on the same layer as the gate line, as well as include the signal transfer unit CG2 disposed on the same layer as that of the data line. In this manner, the pad PG2 and the signal transfer unit CG2 may be directly connected by a connection unit SG2. The signal transfer unit CG2 may also be disposed on the same layer as the wiring of the data line, which may be disposed on a "last-end" layer. As such, the data line may be directly connected with the signal transfer unit CG2 without a separate connection unit; however, it is contemplated that a connection unit may be utilized. Further, the signal transfer unit CG2 may be configured to exhibit a structure that extends in a diagonal direction and does not overlap the signal transfer unit CG1. That is, the signal transfer unit CG2 may be spaced apart from the signal transfer unit CG1 by a predetermined distance. It is also noted that since the signal transfer units CG1 and CG2 may be configured to not overlap one another, the bent portion described in association with FIGS. 7 and 10 may not be utilized.

According to exemplary embodiments, respective pairs of fan-out wiring structures may be configured to partially overlap, such as will be described in association with FIGS. 13 and 14.

As seen in FIG. 13, the fan-out wiring structure may be similarly configured as the fan-out wiring structure of FIGS. 3, 9, and 11, but may be different in that the signal transfer units C1 and C2 are configured to only partially overlap in, for example, an area corresponding to the fan-out wiring area 325 and/or the peripheral area 320. To this end, it is noted that even though the signal transfer units may be configured to partially overlap one another, the pair of adjacent fan-out wiring structures may be disposed on different layers, such that an interval between the respective fan-out wiring structures may be reduced. In this manner, a width of the peripheral area 320 may be decreased.

As seen in FIG. 13, the fan-out wiring structure associated with pad P1 may, thereby, include the pad P1 disposed on the same layer as the gate line, as well as include the signal transfer unit C1 disposed on the same layer as the gate line. To this end, the fan-out wiring structure associated with pad P1 may further include a connection unit (not shown) disposed and, thereby, configured to connect the wiring in the layer associated with the data line, which may be disposed on a "last-end" layer. As such, the signal transfer unit C1 may exhibit a zigzag structure bent in a shape of a squared-off numeral two, e.g., "ㄹ." As previously mentioned, the patterned configuration may be configured to normalize the resistivity characteristics of the fan-out wiring structures. Further, it is noted that the connection unit may be manufactured from (or include) the same material as a pixel electrode, and the pixel electrode may be disposed on the passivation layer 180, as shown in FIG. 4.

According to exemplary embodiments, the fan-out wiring associated with pad P2 may, thereby, include the pad P2 disposed on the same layer as the gate line, as well as include the signal transfer unit C2 disposed on the same layer as the data line. In this manner, the pad P2 and the signal transfer unit C2 may be directly connected by a connection unit S2. Further, the signal transfer unit C2 may be formed on the same layer as the wiring of the data line, which may be disposed on the "last-end" layer. As such, the signal transfer unit C2 may be directly connected with the data line without a separate connection unit; however, it is contemplated that a connection unit may be utilized. In exemplary embodiments, the signal transfer unit C2 may exhibit a zigzag structure bent in a shape of a squared-off numeral two, e.g., "ㄹ." To this end, the signal transfer unit C2 may be oppositely bent with respect to the signal transfer unit C1, such that the signal transfer units C1 and C2 partially overlap. The partial overlapping of the signal transfer units C1 and C2 may be further facilitated by the dimensioning and disposition of the bent portions of the respective signal transfer units C1 and C2, as can be appreciated in the depiction of FIG. 13.

Adverting to FIG. 14, it is noted that the illustrated fan-out wiring structure may be similar to the fan-out wiring structure of FIGS. 7, 10, and 12, but may be different in that the signal transfer units C1 and C2 are configured to partially overlap one another in, for instance, their direction of extension. Further, the fan-out wiring structure of FIG. 14 may be configured without the bent portion CG12' illustrated in association with, for instance, FIG. 7.

As shown, the fan-out wiring structure associated with pad PG1 may, thereby, include the pad PG1 disposed on the same layer as the gate line, as well as include the signal transfer unit CG1 disposed on the same layer as the gate line. To this end, the fan-out wiring structure associated with pad PG1 may further include a connection unit (not shown) that is configured to connect to the wiring in the layer associated with the data line, which may be disposed on a "last-end" layer. The connection unit may be disposed on the same layer as the pixel electrode.

According to exemplary embodiments, the signal transfer unit CG1 may not exhibit a zigzag bent structure as the signal transfer unit C1 illustrated in FIG. 13. Namely, because the fan-out wiring structure associated with signal transfer unit CG1 may exhibit a sufficiently large resistivity characteristic due to its extension in a diagonal direction, patterning signal transfer unit CG1 in a zigzag shape may not be necessary. It is contemplated, however, that the fan-out wiring structure associated with signal transfer unit CG1 may be patterned according to a zigzag bent structure, as well as configured to extend in a diagonal direction.

As seen in FIG. 14, the fan-out wiring structure associated with pad PG2 may, thereby, include the pad PG2 disposed on the same layer as the gate line, as well as include the signal transfer unit CG2 disposed on the same layer as the data line. In this manner, the pad PG2 and the signal transfer unit CG2 may be directly connected by the connection unit SG2. The signal transfer unit CG2 may also be disposed on the same layer as the wiring of the data line, which may be disposed on the "last-end" layer. As such, the data line may be directly connected with the signal transfer unit CG2 without a separate connection unit; however, it is contemplated that a connection unit may be utilized. Further, the signal transfer unit CG2 may be configured to exhibit a zigzag structure and extend in a diagonal direction. As such, the signal transfer unit CG2 may be configured to partially overlap the signal transfer unit CG1 along one or more portions within the fan-out wiring area 325 and/or the peripheral area 320.

It is also noted that since the signal transfer units CG1 and CG2 may be configured to not fully overlap one another, the bent portion described in association with FIGS. 7 and 10 may not be utilized.

As described above, various exemplary fan-out wiring structures have been described in association with FIGS. 3, 7, and 9-14. According to these exemplary embodiments, the fan-out wiring structures may be disposed in the peripheral area 320 of the display panel 300 and, thereby, configured with a normalized resistivity characteristic between respective fan-out wiring structures. In this manner, transmission delay characteristics may also be the same across the respective fan-out structures.

Further, in exemplary embodiments, each data driver 550 may be implemented in association with a plurality, e.g., two, types of fan-out wiring structures, such as described in association with FIG. 8. That is, the fan-out wiring structures exhibiting a zigzag bent structure, such as illustrated in FIGS. 3, 9, 11, and 13, and the fan-out wiring structures exhibiting a structure extending in a diagonal direction, such as illustrated in FIGS. 7, 10, 12, and 14, may be used in conjunction with one another. In other words, the fan-out wiring structures exhibiting a zigzag bent structure may be disposed in a center region of the data driver 550, and the fan-out wiring structures extending in a diagonal direction may be disposed in outer side regions of the data driver 550, e.g., both outer-side regions of the above-noted center region.

Accordingly, since different types of fan-out wiring structures may be disposed and, thereby, configured to exhibit the same resistivity characteristics, various configurations may be possible, which may include one or more combinations between ones of the exemplary embodiments disclosed herein. That is, when materials of the gate line and the data line are the same, the gate line and the data line may be formed to have a same resistivity characteristic by alternating such dimensional constraints as the thickness, length, and width properties of these components. For instance, when the gate line and the data line are formed to have the same thickness, the same resistivity characteristics may be achieved by configuring the gate line and the data line with the same length and width. As another example, when the gate line and the data line are formed to have a different thickness, the same resistivity characteristics may be achieved by differentiating at least one dimension between the length and the width dimensions of these components. When the materials of the gate line and the data line are different, the resistivity characteristics may be normalized by affecting one or more of the thickness, length, and/or width dimensions. Further, when the materials of the gate line and the data line are different, the same resistivity characteristics may be maintained via utilization of a connection unit that is configured to connect to a pixel electrode layer. That is, the resistivity characteristics may be altered by disconnecting the direct connection between the fan-out wiring structure and the pixel electrode and, thereby, utilizing a connection unit at the corresponding disconnection, which may serve to normalize the resistivity characteristics of the entire fan-out wiring structures.

In exemplary embodiments, it is noted that respective pairs of fan-out wiring structures may not overlap one another or may partially overlap one another. When parts or significant portions of the pair of fan-out wiring structures overlap, parasitic capacitance generated in an overlapping region may be reduced utilizing one or more of the above-noted techniques. For instance, when one pixel is divided into two subpixels and the pair of data lines is connected to each subpixel, the difference between the data voltages applied to the two subpixels can be reduced, such that the signal interference due to a voltage difference is also reduced. In addition, even when such a configuration is not utilized, the parasitic capacitance and the signal interference may be reduced by controlling the timing of the application of the two data voltages applied to individual ones of the pair of overlapping fan-out wiring structures. In this manner, the disparate data voltages can be prevented from overlapping (or at least reduced) because the different voltage levels will traverse the respective fan-out wiring structures at different times. As such, gate-on timing may be divided into a plurality (e.g., two) sections, and a data voltage may be applied one by one in each section.

According to various exemplary embodiments, the parasitic capacitance and signal interference may also be reduced by forming a thickness of the insulating layer (e.g., gate insulating layer 140) disposed between the gate line and the data line to be a predetermined thickness or larger and that is configured to prevent the parasitic capacitance and signal interference from affecting the performance of the display device. In exemplary embodiments, the parasitic capacitance and signal interference may also be reduced via the use of an insulating layer (e.g., gate insulating layer 140) exhibiting a low-k value.

According to various exemplary embodiments, the parasitic capacitance and signal interference may also be reduced via utilization of respective pairs of fan-out wiring structures configured not to not overlap) and/or via utilization of respective pairs of fan-out wiring structures that are configured to partially overlap. Even in these situations, the respective pairs of fan-out wiring structures may be disposed in different layers, such as the gate line layer and the data line layer.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A display device, comprising:
    a display panel comprising:
        at least one gate line,
        at least two data lines,
        an insulating layer to insulate the at least two data lines from the at least one gate line,
        a display area comprising a pixel connected to the at least one gate line and the at least two data lines, and
        a peripheral area outside the display area, the peripheral area comprising a pair of fan-out wiring structures, the pair of fan-out wiring structures being insulated from one another via the insulating layer; and
    a data driver configured to apply pixel driving data voltages to the at least two data lines via the pair of fan-out wiring structures,
    wherein each of the pair of fan-out wiring structures comprises:

a bent structure, the bent structure of a first fan-out wiring structure of the pair of fan-out wiring structures comprises the same material as the at least one gate line, and the bent structure of a second fan-out wiring structure of the pair of fan-out wiring structures comprises the same material as the at least two data lines;

a first connection unit extending through the insulating layer to connect the first fan-out wiring structure to a first component disposed in a different layer than the first fan-out wiring structure; and a second connection unit extending through the insulating layer to connect the second-fan out wiring structure to a second component disposed in a different layer than the second fan-out wiring structure, and wherein the first connection unit is disposed in association with first end portions of the pair of fan-out wiring structures and the second connection unit is disposed in association with second end portions of the pair of fan-out wiring structures, the second end portions opposing the first end portions in a longitudinal direction of extension of the at least two data lines.

2. The display device of claim 1, wherein:
the bent structure is a zigzag bent structure.

3. The display device of claim 2, wherein:
each of the pair of fan-out wiring structures comprises:
   a pad configured to receive the pixel driving data voltages from the data driver, and
   a signal transfer unit configured to transfer the applied pixel driving data voltages to a corresponding data line; and
the signal transfer unit comprises the bent structure.

4. The display device of claim 3, wherein:
the first component corresponds to a first data line of the at least two data lines; and
the second component corresponds to the pad.

5. The display device of claim 3, wherein:
the respective signal transfer units of the pair of fan-out wiring structures overlap one another.

6. The display device of claim 5, wherein:
the pixel comprises at least two subpixels, the at least two subpixels being connected to the at least one gate line, and the at least two subpixels being connected to different ones of the at least two data lines; and
the at least two data lines connected to the at least two subpixels are connected to respective ones of the pair of fan-out wiring structures.

7. The display device of claim 5, wherein:
the data driver is configured to respectively apply data voltage to each of the pair of fan-out wiring structures at a different time.

8. The display device of claim 5, wherein:
the insulating layer is a gate insulating layer disposed between the at least one gate line and the at least two data lines; and
the gate insulating layer comprises a low-k material.

9. The display device of claim 3, wherein:
the respective signal transfer units of the pair of fan-out wiring structures only partially overlap one another.

10. The display device of claim 3, wherein:
the respective signal transfer units of the pair of fan-out wiring structures do not overlap one another.

11. The display device of claim 2, wherein:
each of the pair of fan-out wiring structures comprises a substantially similar resistivity characteristic.

12. The display device of claim 1, further comprising:
another pair of fan-out wiring structures,
wherein each of the another pair of fan-out wiring structures extend in a diagonal direction in the peripheral area.

13. The display device of claim 12, wherein:
each of the another pair of fan-out wiring structures comprises:
   a pad configured to receive a data signal from the data driver, and
   a signal transfer unit configured to transfer applied data signal to a corresponding data line.

14. The display device of claim 13, wherein:
at least one of the signal transfer units of the another pair of fan-out wiring structures comprises a bent portion.

15. The display device of claim 13, wherein:
each of the another pair of fan-out wiring structures and each of the pair of fan-out wiring structures comprise substantially similar resistivity characteristics.

16. The display device of claim 1, further comprising:
a static electricity prevention unit comprising at least one thin film transistor or at least one diode in the peripheral area,
wherein the static electricity prevention unit is disposed between the pair of fan-out wiring structures and the display area.

* * * * *